United States Patent
Bolognesi et al.

(10) Patent No.: US 11,834,211 B2
(45) Date of Patent: Dec. 5, 2023

(54) PACKING MACHINE FOR PAPER PRODUCT CONVERTING LINE AND METHOD FOR PACKING OF PAPER PRODUCTS

(71) Applicant: KORBER TISSUE S.P.A., Lucca (IT)

(72) Inventors: Daniele Bolognesi, Ozzano dell'Emilia (IT); Fabio Pattuzzi, Bologna (IT); Umberto Scalici, Lucca (IT)

(73) Assignee: Korber Tissue S.p.A., Lucca (IT)

( * ) Notice: Subject to any disclaimer, the term of this patent is extended or adjusted under 35 U.S.C. 154(b) by 0 days.

(21) Appl. No.: 17/761,705

(22) PCT Filed: Sep. 17, 2020

(86) PCT No.: PCT/IB2020/058666
§ 371 (c)(1),
(2) Date: Mar. 18, 2022

(87) PCT Pub. No.: WO2021/053571
PCT Pub. Date: Mar. 25, 2021

(65) Prior Publication Data
US 2022/0396382 A1    Dec. 15, 2022

(30) Foreign Application Priority Data
Sep. 19, 2019    (IT) .................. 102019000016724

(51) Int. Cl.
*B65B 25/14*    (2006.01)
*B65B 5/08*    (2006.01)
(Continued)

(52) U.S. Cl.
CPC .............. *B65B 25/146* (2013.01); *B65B 5/08* (2013.01); *B65B 5/105* (2013.01); *B65B 25/145* (2013.01);
(Continued)

(58) Field of Classification Search
CPC .. B65B 5/08; B65B 5/105; B65B 5/12; B65B 9/06; B65B 25/145; B65B 25/146;
(Continued)

(56) References Cited

U.S. PATENT DOCUMENTS 5,377,478 A * 1/1995 Kovacs et al. ........ B65B 25/146
53/389.5
7,080,738 B2    7/2006 Gambini
(Continued)

FOREIGN PATENT DOCUMENTS

CN    106742428 A    5/2017
DE    202015100065 U1 *   3/2015 ............. B65D 75/04
(Continued)

*Primary Examiner* — Stephen F. Gerrity
(74) *Attorney, Agent, or Firm* — Breiner & Breiner, L.L.C.

(57) ABSTRACT

Converting line for paper rolls, including at least one converting apparatus adapted to convert paper plies, wound in parent reels, into rolls, a packing machine that in turn includes—a carrier conveyor, on which the rolls coming from the converting apparatus are arranged, —at least one side area at the side of the carrier conveyor, where the rolls are packed, —at least one robot adapted to take the rolls from the at least one conveyor belt and to put them in the at least one side area.

16 Claims, 8 Drawing Sheets

(51) Int. Cl.
| | |
|---|---|
| *B65B 5/10* | (2006.01) |
| *B65B 35/54* | (2006.01) |
| *B65B 57/14* | (2006.01) |
| *B65B 65/00* | (2006.01) |
| *B65B 63/04* | (2006.01) |
| *B65B 35/24* | (2006.01) |
| *B65B 35/16* | (2006.01) |

(52) U.S. Cl.
CPC .............. *B65B 35/16* (2013.01); *B65B 35/24* (2013.01); *B65B 35/54* (2013.01); *B65B 57/14* (2013.01); *B65B 63/04* (2013.01); *B65B 65/006* (2013.01); *B65B 2210/02* (2013.01); *B65B 2220/14* (2013.01)

(58) Field of Classification Search
CPC ......... B65B 35/16; B65B 35/24; B65B 35/54; B65B 57/14; B65B 63/04; B65B 65/006; B65B 2210/02; B65B 2220/14
USPC ... 53/429, 430, 445, 450, 474, 493, 54, 116, 53/118, 520, 154, 550, 237
See application file for complete search history.

(56) References Cited

U.S. PATENT DOCUMENTS

| | | | |
|---|---|---|---|
| 2001/0042359 A1* | 11/2001 | Franzaroli | B65B 25/146 53/435 |
| 2003/0182898 A1* | 10/2003 | Huppi et al. | B65B 5/105 198/370.1 |
| 2012/0209423 A1* | 8/2012 | Sutter et al. | B65B 5/105 901/50 |
| 2013/0334008 A1 | 12/2013 | Overley et al. | |

FOREIGN PATENT DOCUMENTS

| | | | | |
|---|---|---|---|---|
| EP | 0607761 | B1 | 6/1997 | |
| EP | 1260437 | B1 | 5/2004 | |
| EP | 1511602 | B1 | 3/2007 | |
| EP | 1599404 | B1 | 4/2007 | |
| EP | 1775221 | A1 | 4/2007 | |
| EP | 1849729 | A2 | 10/2007 | |
| EP | 1655230 | B1 | 3/2008 | |
| EP | 1771335 | B1 | 9/2008 | |
| EP | 1899228 | B1 | 12/2008 | |
| EP | 1630118 | B1 | 4/2010 | |
| EP | 1400450 | B1 | 8/2010 | |
| EP | 2233400 | A1 * | 9/2010 | ............ B65B 5/105 |
| EP | 1254839 | B1 | 4/2011 | |
| EP | 2462044 | B1 | 7/2013 | |
| EP | 2766266 | B1 | 8/2015 | |
| EP | 1442984 | B1 | 4/2016 | |
| IT | BO2008A000431 | | 1/2010 | |
| WO | 2009060490 | A1 | 5/2009 | |
| WO | 2010092609 | A1 | 8/2010 | |
| WO | WO-2013105899 | A1 * | 7/2013 | ............ B65B 35/24 |
| WO | WO-2013105900 | A1 * | 7/2013 | ............ B65B 35/16 |
| WO | 2019123421 | A1 | 6/2019 | |

* cited by examiner

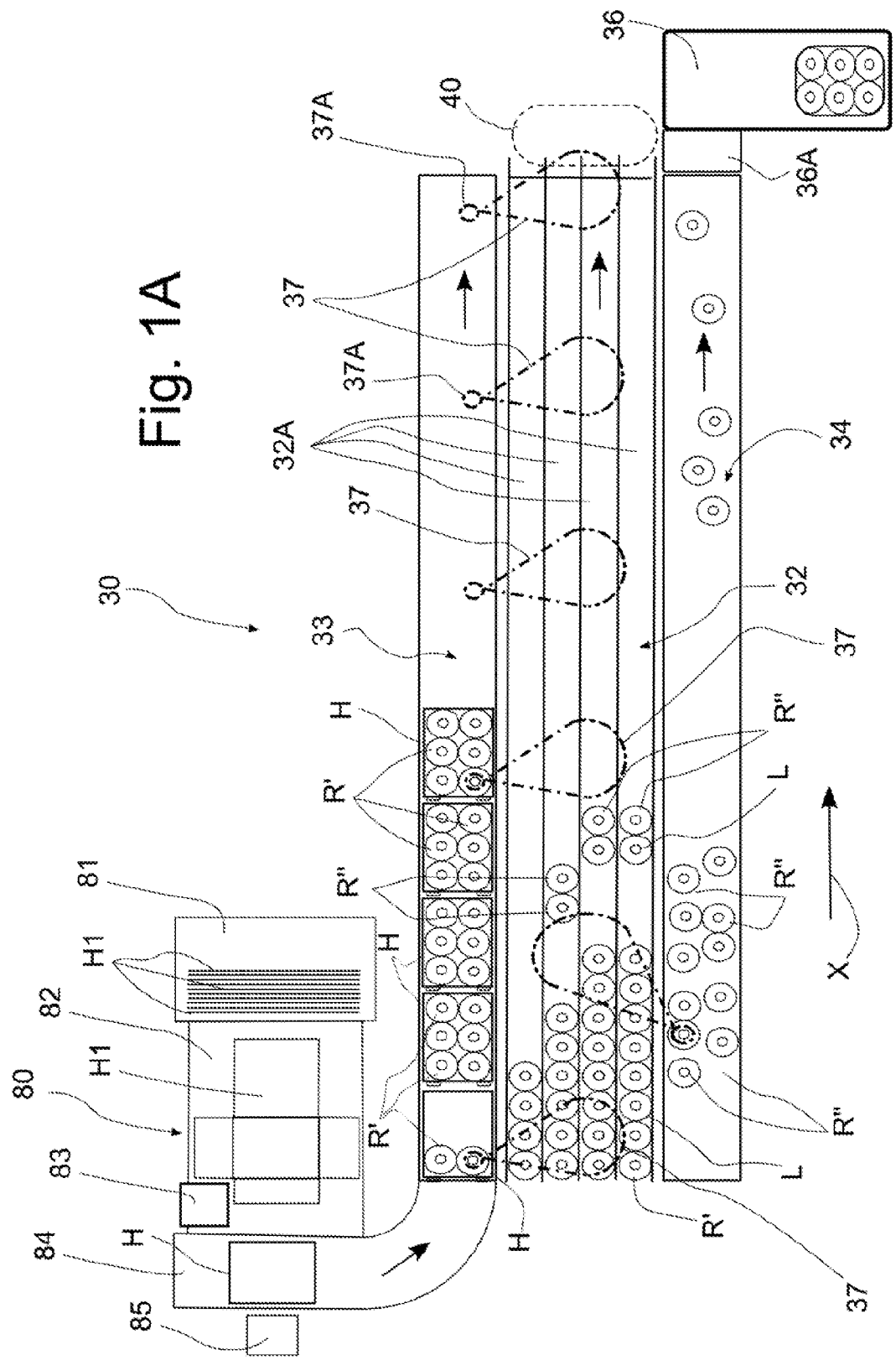

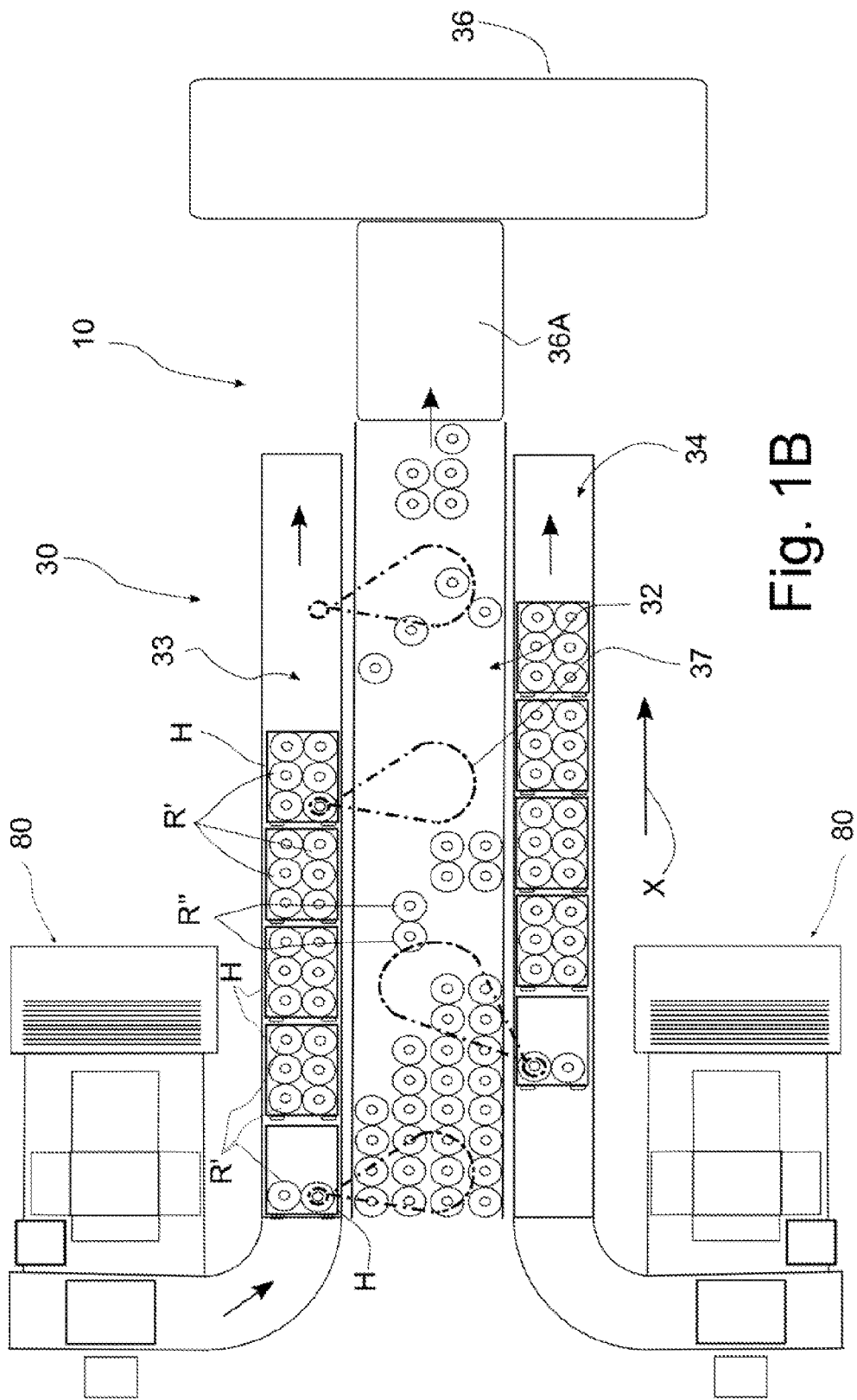

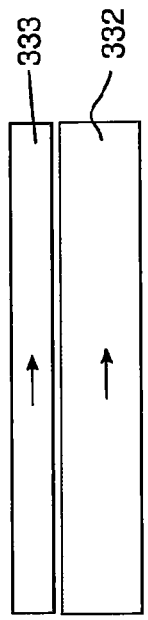
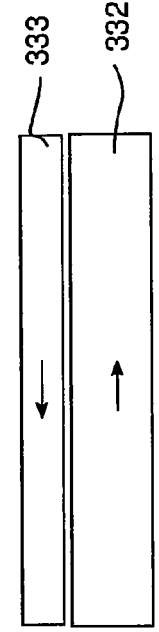
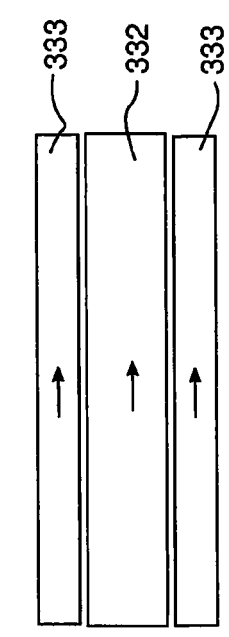
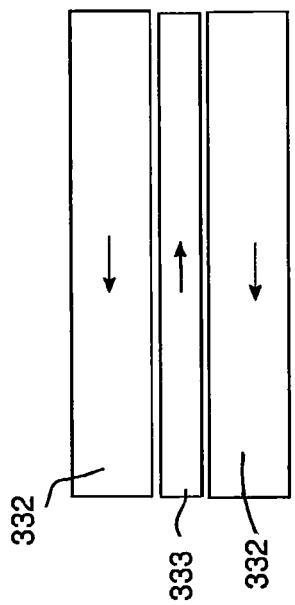
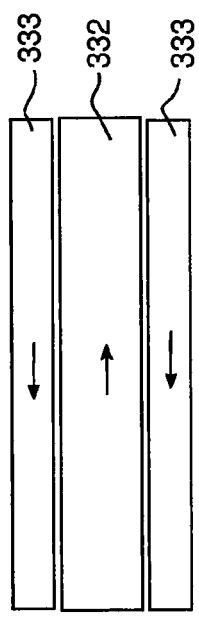
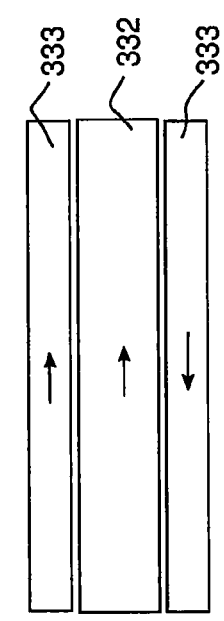
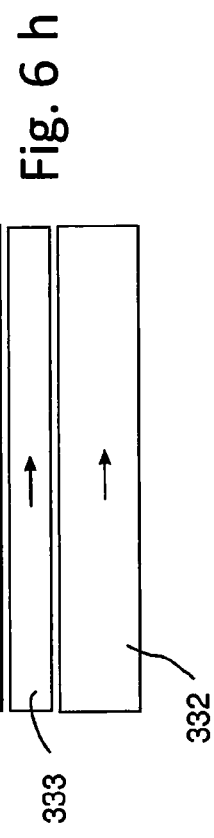

PACKING MACHINE FOR PAPER PRODUCT CONVERTING LINE AND METHOD FOR PACKING OF PAPER PRODUCTS

TECHNICAL FIELD

The present invention relates to the field of paper product packing plants; more in particular, the object of the invention is a packing machine for packing paper products, such as, for example, tissue paper rolls. A further object of the invention is a paper products converting line where the step of packing the final product is optimized, as well as a packing method.

STATE OF THE ART

Paper products, for example tissue paper products, in particular rolls of toilet paper, kitchen towels, interfolded products, handkerchiefs, napkins, paper towels, wipes, cleaning absorbing paper etcetera, are produced on so-called converting lines.

For example, the tissue paper rolls are produced from tissue paper logs of large diameter, the so-called master rolls or parent reels. One or more parent reels are unwound to supply, with one or more plies of tissue paper, a rewinder, which forms logs, or secondary reels, of axial length equal to the axial length of the parent reels, and diameter equal to the diameter of the finished product destined for consumption. The tissue paper plies coming from the parent reels are bonded together to form a web material, which is wound in secondary reels in a winding cradle of a rewinder.

The winding cradle is typically comprised of a plurality of motorized winding rollers, combined, if necessary, with winding mandrels or tail stocks, for example in some cases when the rolls are formed around tubular winding cores. The winding rollers are kept in rotation at adequate peripheral speeds, and in surface contact with the secondary reel being formed, so as to transmit this secondary reel the torque necessary for winding it.

Then, the secondary reels are subjected to a series of further processing, among which: closing the tail edge of the web material, to prevent it from interfering with the successive steps of the production process, and cutting into single rolls of axial dimension equal to the axial dimension of the finished product intended for consumption. During the cutting step, the ends of the secondary reel, where usually a series of defects in the continuity and thickness of the wound product are concentrated, are trimmed, i.e. cut away. The wastes resulting from cutting the ends are called "trimmings" or "trims"; once they have been cut, they are collected and sent to the pulping mill.

The produced rolls are fed to a packing station, keeping the axis thereof horizontal.

In general, the presence of trimmings in the packing machines often causes jamming and downtimes that make the converting line poorly efficient. For this reason, a further device is usually provided before the exit from the cutting area, which eliminate the trimmings of the rolls. These devices, known in the industry, usually use suction systems, or mechanical trap systems, or a combination thereof, to make the trimmings deviate or fall from the feed path, while making the rolls move forwards. Example of devices for the elimination of trims are disclosed in EP1511602, U.S. Pat. No. 7,080,738, EP0607761. These devices for the elimination of trims are often complex, noisy, and energy-intensive due to the suction systems; above all, they do not ensure the complete elimination of trimmings.

Mainly, the packing stations have entrance devices, like transport belts, pushing the lines of coaxial rolls, with horizontal axis, towards a forming station, where a group of rolls is formed, and a vertically movable elevator, thus realizing a group of adjacent rolls, with horizontal axis, in one or more layers. Then, the packing machine wraps the group of rolls with a plastic or paper film, thus realizing the pack of rolls. An example of this packing station is disclosed in WO2009060490. The packs made by the packing machine using plastic or paper film are usually grouped and bagged in big plastic bags. Examples of these bagging machines are disclosed in EP1442984, EP1771335.

Similarly, tissue paper interfolded products, such as wipes and paper towels, are produced from parent reels of large diameter, from which one or more plies are unwound. The plies can be bonded together, for example through embossing, and then folded, thus forming piles of interfolded sheets, so that the tail edge of a sheet taken from the pile draws the leading edge of the subsequent sheet. There are many types of interfolded products having two or more panels. Machines of this type are disclosed for example in EP2462044, EP1630118. In general, the single piles of interfolded sheets are packed in cardboard boxes or wrapped in thin cardboard. Other types of folded, but not interfolded, products are the napkins and the handkerchiefs, the production processes of which are known and disclosed, for example, in WO2010/092609, EP1599404. Each of these products requires a specific type of packing, known and described, for example, in EP1400450, EP1260437.

These packing stations, even if appreciated by the market thanks to the reliable operation, can be however improved.

In fact, the market of the machines for producing and packing tissue paper products requires lines suitable to increasingly increase the production speed and, thus, the packing speed.

The market further requires increasingly performing machines in terms of production flexibility, and therefore in terms of packing flexibility of different products on the same line, thus reducing as much as possible the downtimes necessary to set-up the lines for changing product.

Furthermore, the market often requires more eco-friendly packing systems, i.e. more sustainable than the known systems.

SUMMARY

An object of the invention is to provide a packing machine, for packing tissue paper products, and a converting line carrying a packing machine, adapted to meet the needs in the production of paper products such as toilet paper rolls, kitchen towels rolls, napkins, handkerchiefs, interfolded products, etcetera. More in particular, an important object of the invention is to provide a packing machine for packing tissue paper products that is suitable to speed up the packing step, and a converting line that is suitable to convert rolls, napkins and interfolded products in a more efficient and flexible manner.

A further object of the invention is to provide a packing machine for rolls and/or other paper products that is flexible to be used, i.e. that allows working with products requiring different packing methods.

These and other objects, that will be better described below, are achieved through a packing machine for packing paper products, comprising:

at least one carrier conveyor, onto which the tissue paper products to be packed are arranged;

at least one side area at the side of the carrier conveyor, where the tissue paper products are packed;

at least one robot adapted to take the tissue paper products from the at least one carrier conveyor and to put them in the at least one side area.

In practice, the tissue paper products, once exited the respective forming machine, like rewinders, folding and interfolding machines, primary packing machines, are brought on the at least one carrier conveyor that moves along a main direction. The robots can therefore handle many products in a short time. At least one packing area is provided at the side of the at least one carrier conveyor, so that a large space is available for processing more packs at the same time.

A plurality of robots are preferably provided, arranged preferably above the carrier conveyor, along the feed direction.

According to preferred embodiments, one or more robots are parallel robots, preferably of the Stewart platform type. In practice, the parallel robot comprises a movable platform, on which a handling member is provided for taking the roll, and the platform is connected to a fixed platform through a plurality of articulated actuating arms that can vary, if necessary, in length, thus changing the distance between the two platforms, in controlled fashion.

Other types of robots can be used, for example of the open chain type, known as SCARA robots, i.e. robots with three axes, two of which are used for the movement in a horizontal plane, while the third one is used for moving a gripping tool in a direction orthogonal to the plane.

According to some embodiments, the at least one carrier conveyor has a plurality of lanes parallel to the feed direction and adapted to receive parallel lines of tissue paper products. This allows a simple arrangement of the tissue paper products on the at least one carrier conveyor.

According to preferred embodiments, the at least one carrier conveyor is formed by a plurality of adjacent conveyor belts defining a plurality of lanes parallel to the feed direction and adapted to receive parallel lines of tissue paper products. The plurality of conveyor belts allows greater flexibility in rolls handling, as it is possible to vary, for example, the speed of each conveyor belt according to the needs.

Adequately, according to preferred embodiments, when the products to be packed are rolls, the at least one carrier conveyor defines a rest surface for the flat faces of the rolls; this means that the rolls are arranged with the central axes thereof orthogonal to the carrier conveyor. This allows moving the rolls in a stabler and more accurate fashion. In other embodiments, the rolls lie with the axes thereof arranged horizontally.

In the case of interfolded products or napkins, the products can be fed to the carrier conveyor resting on the flat face. In this case, the interfolded products may be fed to the carrier conveyor already pre-packed, i.e. wound with a plastic or paper film, or even pre-packed in small boxes (in a primary packing step carried out in a converting line upstream of the packing machine of the invention).

In some embodiments, the paper products, for example the piles of interfolded sheets or the rolls, are fed to the carrier conveyor partially wrapped, i.e. partially wound with a paper sheet; for example, in the partially wrapped rolls the two flat sides are free, whilst in the interfolded products, for example wipes, the two transverse sides, where the piled sheets are visible, are free.

According to preferred embodiments, when the products are rolls, a device is adequately provided for setting the rolls upright so that the axes thereof take a vertical position; this device is arranged at the entrance of the at least one carrier conveyor. In practice, this device allows overturning the axis of the rolls, for example by 90°, thus moving the rolls from an arrangement where the axis thereof is horizontal, consistently with the typical arrangement of the rolls after the cutting step in a converting line, to an arrangement where the axis thereof is vertical, so that a flat base thereof rests on a surface.

In known manner, the paper rolls may be provided with an axially hollow central cylindrical core, made for example of cardboard or hardened paper, or simply provided with an axial cavity devoid of core, or completely filled with paper layers also in the central area.

According to preferred embodiments, the at least one side packing area comprises a transport belt parallel to the at least one carrier conveyor. This allows, for example, moving the products from the at least one carrier conveyor to the side transport belt, where at least part of packing is carried out; from here, the pack, or a part thereof, is moved parallel to the at least one carrier conveyor, thus increasing the packing productivity.

The direction of movement of the at least one carrier conveyor and the at least one transport belt of the at least one packing area may be the same, i.e. they move in the same direction, or may be opposite, i.e. they move in opposite directions, according to the production needs.

The speed of the at least one carrier conveyor and the at least one transport belt of the at least one packing area may be different according to the production needs.

According to prior art, the terms "carrier conveyor", "conveyor belt", "transport belt", etc. refer to a support means, onto which the products rest, which is moved in the desired direction controlled by moving means, which may comprise one or more flexible elements such as flat belts, nets, grids etc. that are moved for example by means of return and moving rollers, or rigid elements, for example formed by multi-flexible rigid plastic elements (such as those produced by Flexlink®), chains, etc., or series of rollers that can be rotated in the feed direction, onto which the products rest, etcetera.

Two distinct side packing areas are preferably provided, arranged at opposite sides of the carrier conveyor. In this way it is possible, for example, to realize differentiated packs on different side packing areas, for example a type of pack for a specific packing area, thus increasing the line flexibility.

According to preferred variants of embodiment, on the at least one side packing area a plurality of boxes are provided, where the robot puts the paper rolls. Preferably, on the at least one side packing area the boxes are arranged horizontally or slightly inclined, to facilitate the insertion of the tissue paper products. Preferably, the boxes are so inclined as to have the upper face slightly facing the carrier conveyor.

According to preferred embodiments, the at least one side packing area comprises a wrapping station where the products are wrapped in plastic or paper film; if necessary, the side packing area comprises a plurality of winding stations arranged in series along the side extension of the side packing area.

According to preferred embodiments, the at least one side packing area comprises a bagging station, where a group of products, if necessary wrapped in a film, is inserted into a bag, preferably a plastic bag.

According to preferred embodiments, the packing machine of the invention is adapted to form groups of products on the at least one side packing area and to process these groups of products so as to pack them; the groups being obtained by directly positioning the products, handled by the at least one robot, on the at least one packing area or through at least one grouping device working on the at least one packing area.

In some embodiments, on the two sides of the carrier conveyor two side packing areas are provided, comprising for example transport belts, on which boxes with paper products inserted therein, and packs of products simply wrapped in a film, are respectively realized. The products may be of the same kind for both types of packaging, or of different kind. The paper products in the boxes may be of different type.

In further embodiments, on the two sides of the carrier conveyor two side packing areas are provided, comprising for example transport belts, and on both the areas either boxes with paper products inserted therein, or packs of products simply wrapped in a film, are realized. The products may be of the same kind for both types of packaging, or of different kind.

According to a variant of embodiment, the packing machine of the invention comprises two carrier conveyors, to which different types of paper products are preferably fed, and between the two carrier conveyors a transport belt is provided, to which boxes are preferably fed.

In practice, it is possible to have two parallel carrier conveyors that support different type of products, between which a transport belt is arranged (which is therefore at the side of both the carrier conveyors). In this case, the robots take the products from the two carrier conveyors and pack them, at least partially, on the central transport belt. The central transport belt is preferably supplied with cardboard boxes that can be filled with different products. For example, boxes comprising one or more of the following products can be formed: rolls of toilet paper, rolls of kitchen towels, handkerchiefs, wipes, napkins, and further products. The folded products, such as wipes, napkins and handkerchiefs, may be already pre-packed when arrive onto the carrier conveyor, and therefore before being packed in the cardboard box.

According to preferred embodiments, if on the at least one transport belt boxes are provided, inside which the at least one robot puts the products, these boxes come from a box forming station that supplies the at least one transport belt with boxes.

The box forming station is preferably provided with a storage module for cardboard blanks, a first moving device to send the cardboard blanks to a module where the blanks are folded, with which a gluing module is associated for gluing the blank edges to form a box, and a second moving device sending the formed boxes to the at least one transport belt.

This box forming station is preferably arranged at the side of the at least one transport belt, wherein the feed direction of the cardboard blanks from the storage module to the forming module being preferably parallel and opposite to the moving direction of the transport belt.

According to preferred embodiments, the packing machine of the invention comprises a recognition device for recognizing the products moving on the at least one carrier conveyor.

This recognition device for recognizing the products moving on the at least one carrier conveyor is able to recognize, i.e. to identify, the position of the paper products on this at least one carrier conveyor.

An electronic management program is preferably provided, adapted to associate, with a type of product identified by the recognition device, a control for a robot regarding the actions of taking the product and moving it towards the at least one side packing area where the product in question shall be packed.

Preferably, in case of more types of paper products, the electronic management program is adapted to associate, with each type of product identified by the recognition device, a control for a robot regarding the actions of taking the product and moving it towards the at least one side packing area where that specific product shall be packed.

In some embodiments, the robots are provided above the transport belt and are so controlled as to take different paper products and to insert them into boxes or moving them towards packing areas, in order to realize packs or boxes containing paper products that are at least partially different from one another.

According to some embodiments, the packing machine comprises identification means for identifying the boxes on the at least one conveyor on the at least one packing area, adapted to recognize and/or to identify the position of the boxes on the at least one conveyor and, through an electronic program, to indicate the at least one robot where to put the taken product.

These identification means comprise, for example, one or more vision systems (video cameras, optical sensors, photocells, etc.) arranged at the entrance of the at least one packing area, i.e. near the beginning (the point where the boxes enter) of a respective transport belt.

According to preferred embodiments, the packing machine comprises at least a discharge area for discharging waste products moving on the at least one carrier conveyor, for example non-conform products, i.e. products with defects or production wastes like trimmings coming from a severing machine cutting a paper reel into paper rolls.

In some embodiments, an electronic management system is provided, adapted to associate, with a production waste arranged on the at least one carrier conveyor and identified by the recognition device, a control for a robot regarding the actions of taking the waste roll or product and moving it towards a discharge area.

The at least one discharge area is preferably provided at the end of the at least one carrier conveyor; in this way, the wastes are not taken from the at least one robot, and are moved by the carrier conveyor towards the discharge area, where they enter, for instance fall, at the end of the carrier conveyor.

According to some embodiments, a group of products is formed on the at least one transport belt parallel to the carrier conveyor, the products being adapted to be packed in a further packing module, which can comprise, in turn, at least one wrapping station and/or at least one bagging station. In an embodiment of the invention, the further packing module comprises a packing station of the type forming a continuous tube of a plastic film or a paper film, where the group of products enters, so that closing joints are made at the ends of the tube portion to form a bag.

The further packing module is preferably arranged at the end of the transport belt parallel to the carrier conveyor, and the group of products, exiting the transport belt, is thus fed to a further packing module; this further packing module being preferably provided at the end of this transport belt.

According to preferred embodiments, a product recognition device is provided, comprising at least a video cam arranged preferably above the at least one carrier conveyor. This at least one video cam is preferably provided in correspondence of where the products enter the at least one carrier conveyor.

For example, if the at least one carrier conveyor is provided with more lanes for the products, a single video cam may be provided controlling all the lanes, or a video cam may be provided for each lane, or a video cam for defined groups of lanes (so that a number of lanes may be provided greater than one but lower than the number of lanes).

According to preferred embodiments, the recognition device comprises a video cam arranged on the at least one robot.

In some embodiments, both one or more video cams associated with the at least one carrier conveyor, and video cams associated with the robots are provided.

In some embodiments, the video cams recognize the non-conform paper products, i.e. the products that do not meet the desired quality standards.

In some embodiments, the video cams recognize the trimmings of the paper products.

In a preferred embodiment of the invention, a non-conform product recognized by the video cam is discharged.

In the case of products like paper rolls, the non-conformity may be caused, for example, by a severing machine that cuts askew, by color stains due to malfunctions of printing or embossing machines, by not glued paper plies, by wrong closing of the roll free edge, etcetera.

In the case of products like folded sheets, the non-conformity may be, for example, a wrong formed pile, stained paper plies, paper plies not embossed as required, etcetera.

In the case of pre-packed products, the non-conformity may be, for example, an excessively deformed pack, an opened or partially opened pack, etcetera.

The term "video cams" refers to any optical vision system, preferably of the digital type.

According to preferred embodiments, in the case of paper products such as paper rolls, the recognition device comprises a photocell or an optical sensor, a video cam, etcetera, arranged along the carrier conveyor and adapted to verify the presence of rolls preferably higher than a pre-set measure, and these rolls are taken by the at least one robot. For instance, the rolls higher than a given height are taken by the robot(s) and brought to the packing area(s), whilst the rolls lower than the given height are considered wastes or trimmings and are not taken by the robot(s), and are made for example fall onto a discharge area provided at the end of the carrier conveyor.

According to preferred embodiments, the at least one robot comprises a handling member for taking and releasing the products, which is preferably a pincer-like gripping tool
of the type with jaws, between which a product is held, or, if the product is in the form of a roll, of the expansion-typeadapted to be inserted inside a central hole of the roll, devoid of material, and to expand pressing against the walls of the hole.

According to further embodiments, handling member is of the sucker type.

According to some embodiments, the at least one carrier conveyor transporting the paper products ends on a further packing area, so that the paper products are fed to the at least one carrier conveyor continuously (i.e. without being put by the at least one robot in the side packing areas), on the at least one further packing area, preferably of the type comprising a wrapping station and/or a bagging station and/or a packing station of the type forming a continuous tube of a plastic film or a paper film, where the group of products enters, so that closing joints are made at the ends of the tube portion to form a bag. Examples of these stations are disclosed in EP1655230, EP1899228, EP1254839, EP1771335, EP2766266, BO2008A000431.

In this description, the term "winding station" may refer to a so-called wrapper, i.e. a station where the group of products is wrapped in a flat film strip (made of plastic, paper or other material), folded around the group (and therefore the station can comprise one or more devices for folding the film strip around the group of products), differently from a bagging station, where the group of products is inserted in a pre-formed bag, or a tube packing station, where the group of products is inserted in a tube of film that is then cut and closed at the sides.

Therefore, in the case described above, first paper products provided on the carrier conveyor are taken by the at least one robot and put on the at least one transport belt, whilst second paper products are left moving on the at least one carrier conveyor towards the further packing station provided at the end of this at least one carrier conveyor, or the second paper products are handled by the at least one robot so as to be conveniently grouped on the at least one carrier conveyor to be fed to the further packing station. Furthermore, in the structure described above it is possible to choose, according to the specific needs, whether to package by supplying only the at least one side transport belt, or by supplying only the further packing station arranged at the end of the carrier conveyor.

According to a further aspect, a further object of the invention is a converting line for converting paper plies, wound into parent reels, into paper products, the line comprising a packing machine according to one or more of the configurations described above.

According to some embodiments, this converting line comprises two or more branches for converting different tissue paper products, that end on a common packing machine, so that on this common packing machine there may be different types of paper products, for instance rolls of toilet paper, rolls of kitchen towels, handkerchiefs, napkins, wipes and other known products.

The converting line is preferably of the type comprising a branch for producing paper rolls by converting paper plies wound into parent reels, the branch comprising
an unwinder for unwinding at least one parent reel, into which a paper ply is wound,
a rewinder, adapted to produce a secondary reel by winding at least one paper ply unwound from the at least one parent reel, of diameter substantially equal to the diameter of the rolls to be produced,
one or more severing machines, adapted to cut this secondary reel into paper rolls.

According to preferred embodiments, the secondary reel of paper to be cut has patterns or embossing differentiated in axial direction, so that the severing machine cuts the secondary reel so as to have rolls with different patterns or embossing, adapted to be subsequently moved on the carrier conveyor. For example, a device for differentiated embossing or printing is provided inside the converting apparatus, between the unwinder of the parent reel and the subsequent winder winding a secondary reel of lower diameter. In other embodiments, the reel already embossed or printed in a differentiated manner along the axis thereof is the parent reel arriving to the unwinder of the converting line.

The at least one severing machine is preferably adapted to cut longitudinally the secondary reel into paper rolls, and to cut the ends of this secondary reel, thus producing two wastes that are called "trimmings"; the trimmings are adequately adapted to move on the at least one carrier conveyor of the packing machine up to a discharge area associated with the packing machine. In this way, a component of the prior art lines can be omitted, i.e. the machine for eliminating the trimmings that is associated with the severing machine, to the advantage of the economy and the size of the line in the reel cutting area.

According to a further aspect, a further object of the invention is a method for packing of paper products, comprising the steps of:

produced paper products starting from parent reels, through at least one converting line for converting paper plies, moving the products, eventually even partially prepacked, onto at least one carrier conveyor, moving, through a robot, the products from the at least one carrier conveyor to at least one side packing area arranged at the side of the carrier conveyor;

making a pack, containing a plurality of products, on the at least one packing area.

Preferably the products, if they are paper rolls, before entering onto the carrier conveyor are set upright by bringing the axis thereof from an horizontal to a vertical position.

According to preferred embodiments, the robots are parallel robots, preferably of the Stewart platform type.

According to preferred embodiments, the robots are of the open chain type, preferably SCARA robots.

According to preferred embodiments, the method provides for recognizing the products moving on the carrier conveyor, and for moving the recognized products to specific packing areas.

According to preferred embodiments, the methods provides for recognizing at least two types of products moving on the at least one carrier conveyor, and for moving the recognized products to specific packing areas, in order to realize packs of at least two different types of products, i.e. to realize, on the same packing machine, equal packs containing differentiated products, or two types of packs, each pack containing products of the same type.

According to preferred embodiments, the method provides for transporting along the carrier conveyor also, at least partially, paper wastes resulting from the production upstream of the carrier conveyor, and for moving the wastes to at least one discharge area. Preferably, if the products are rolls, the wastes are the trimmings of the secondary reels, from which the rolls to be packed are produced.

Preferably, the wastes move along the at least one carrier conveyor up to the end thereof, thus falling, at the end of the conveyor, preferably through gravity, into a discharge area.

According to preferred embodiments, on at least one side packing area at least one box is provided, opened at the top, into which a plurality of products are inserted by one or more robots; the box is preferably adapted to move parallel to the at least one conveyor belt.

According to preferred embodiments, the box is inclined on a side, so that the products can slide, through gravity, towards a side of the box.

Preferably, at least one side packing area is defined on at least one transport belt moving parallel to the at least one carrier conveyor.

According to some embodiments, the at least one transport belt moves in the same direction or in opposite direction with respect to that of the at least one carrier conveyor. This configuration not only allows better to balance the robots and to process the entering products, but it also offers significant advantages in terms of operation and space necessary for the plant.

Preferably, on at least one side packing area a plurality of products coming from the at least one conveyor belt are wrapped in film by one or more robots, so as to make a pack of rolls.

According to some embodiments, a plurality of products are bagged on at least one side packing area.

According to preferred embodiments, two side packing areas are provided, arranged at the sides of the at east one carrier conveyor.

According to preferred embodiments, two carrier conveyors are provided, and one side packing area arranged therebetween.

BRIEF DESCRIPTION OF THE DRAWING

The invention will be better understood by following the description below and the attached drawing, showing a non-limiting embodiment of the invention. More in particular:

FIG. 1A is a schematic plan view of a packing machine according to the invention, a variant of the example of FIG. 1;

FIG. 1B is a schematic plan view of a packing machine according to the invention, a variant of the example of FIG. 1 and FIG. 1A;

FIGS. 6a-6h show summary diagrams of the arrangements of the carrier conveyors in some embodiments, which are adapted to transport the products before packing, with transport belts forming the side packing areas.

DETAILED DESCRIPTION OF EMBODIMENTS

Figure 1:
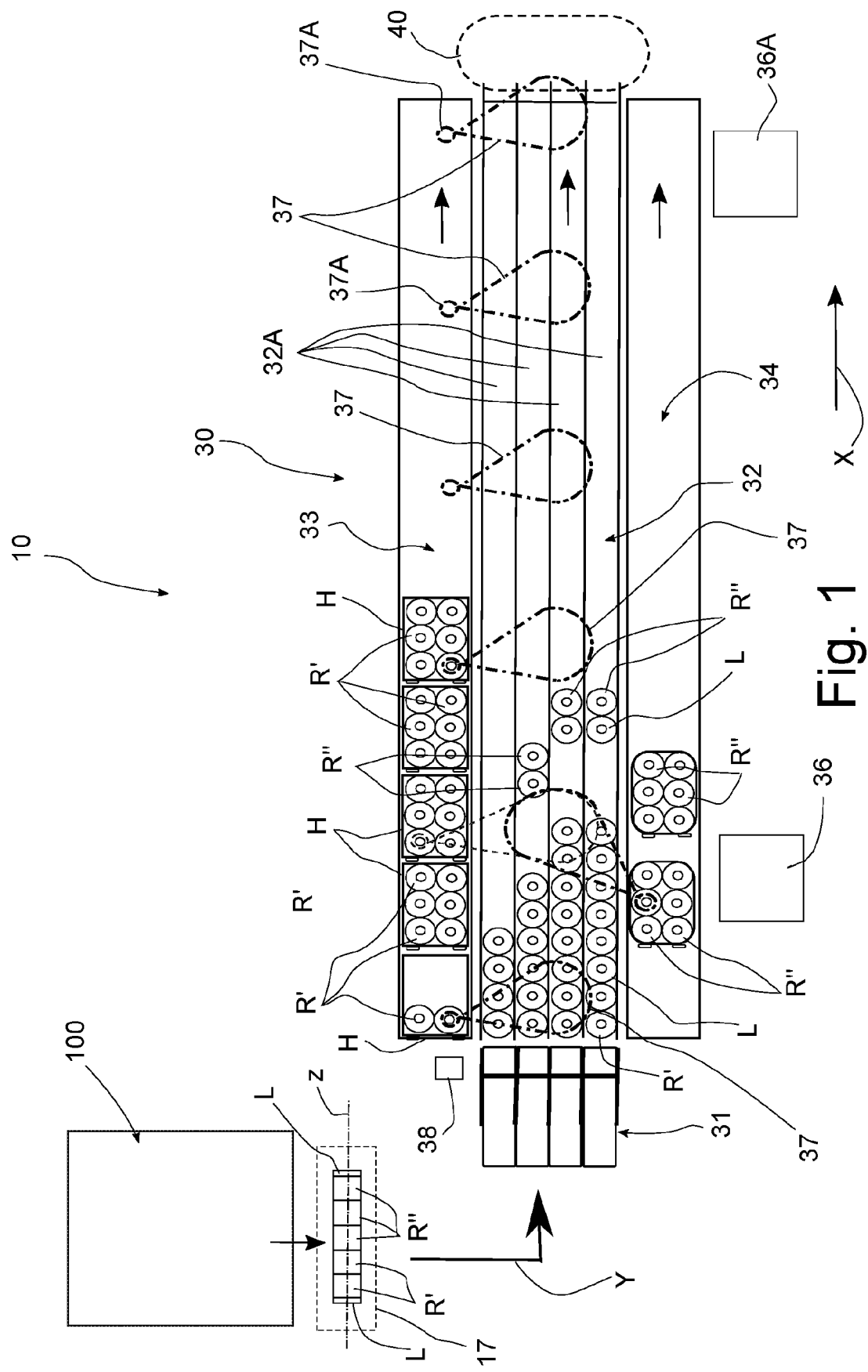
FIG. 1 is a schematic plan view of a converting line with a packing machine according to the invention.
Figure 2:
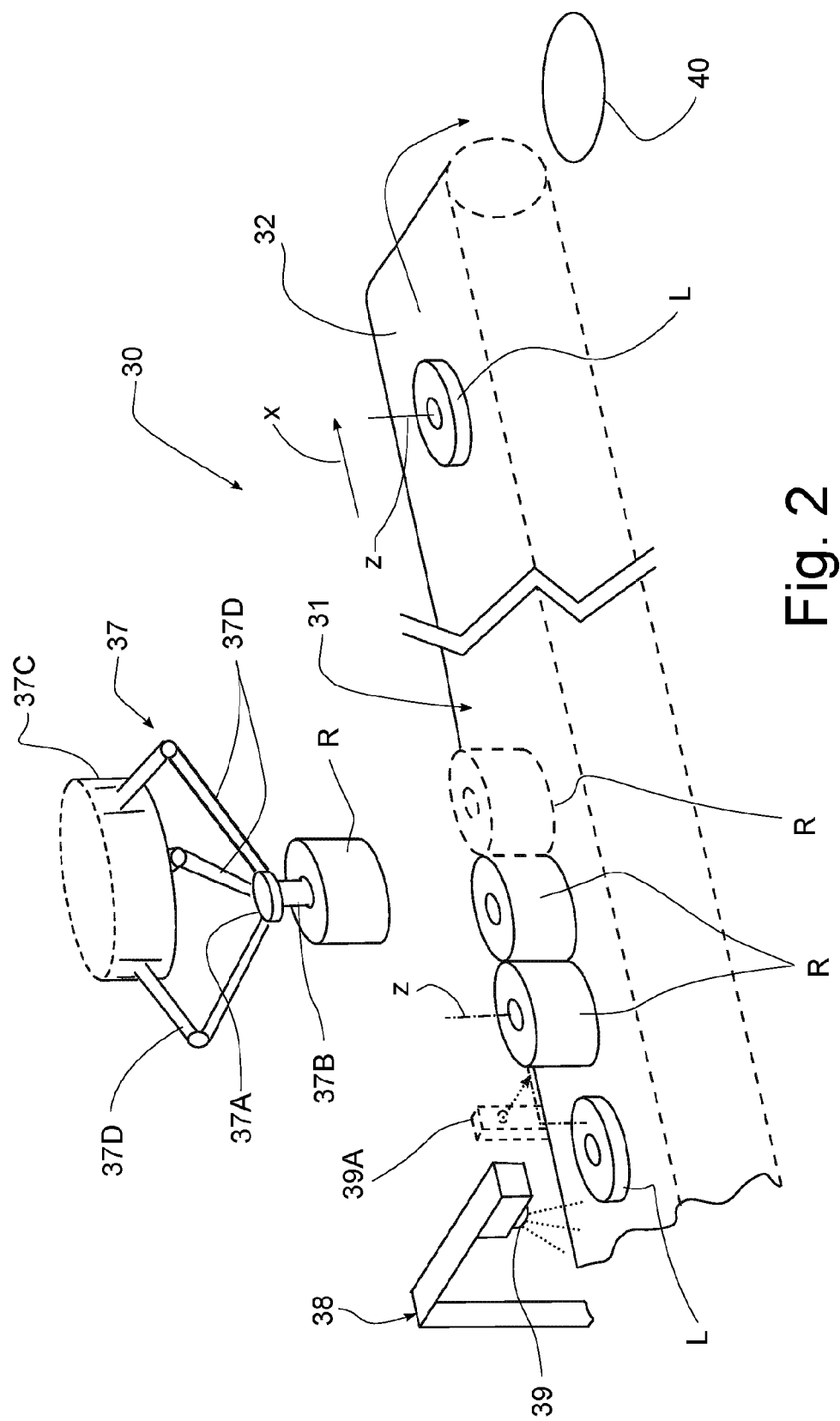
FIG. 2 is a schematic perspective view of a portion of the packing machine of the converting line according to the invention.
Figure 3:
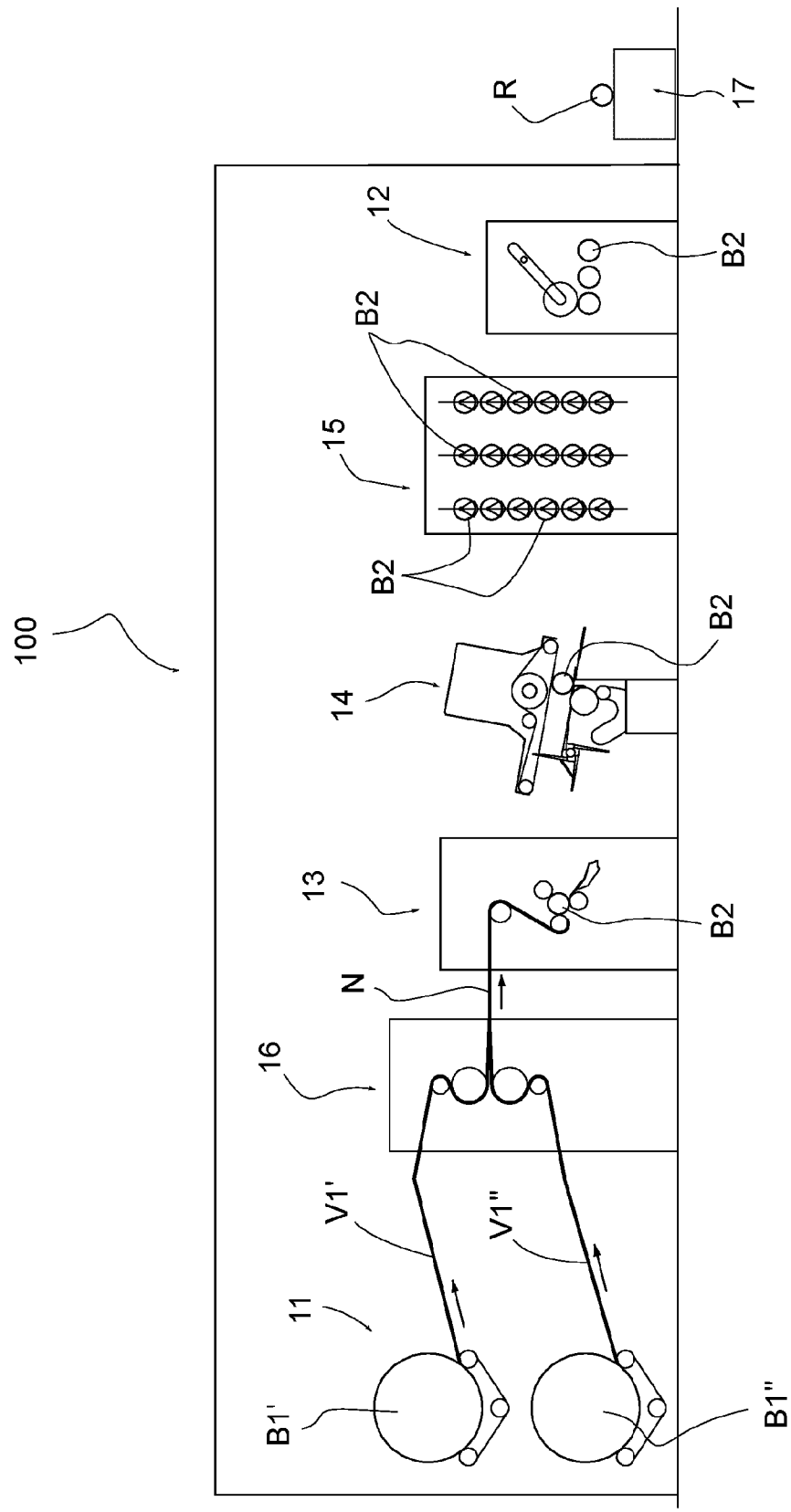
FIG. 3 is a schematic side view of a converting apparatus for converting cellulose plies into paper rolls, for a converting line with a packing machine according to the invention.

With reference to FIGS. 1 to 3, a packing machine according to the invention is indicated as a whole with number 30. In this example, the packing machine is a machine for packing rolls of paper.

In the same figures, a converting line for paper rolls, for instance tissue paper rolls, according to the invention is indicated as a whole with number 10.

The converting line 10 therefore comprises, in succession, a converting apparatus 100, for converting paper plies wound in parent reels into paper rolls, and a packing machine 30.

The converting apparatus 100 for converting paper plies wound in parent reels into paper rolls may have a plurality of stations, some of which are schematically indicated in FIG. 3. In some embodiments, the apparatus 100 comprises an unwinder 11, where one or more large diameter rolls, so-called master rolls or parent reels B1' and B1" are arranged, on which plies V11, V1" of web material, for example cellulose plies, such as tissue paper plies, are wound. Different types of unwinders are known to those skilled in the art, and can be realized in different ways. Therefore, the details thereof will not be described herein. In the illustrated example, two parent reels B1' and B10" are provided, which supply two plies V1', V1", but it shall be understood that the number of parent reels and the number of plies supplied from the unwinder 11 can be different.

One or more processing stations for the plies V1', V1" can be arranged downstream of the unwinder 11. For example, a printing station or unit can be provided, for printing one or both the plies, individually or after having bonded them together. In some embodiments, in addition to, or as a replacement of, the printing station or unit, an embossing unit 16 can be provided. The plies V1' and V1" can be embossed and bonded, for example glued, in the embossing unit 16, so as to form a multi-ply web material N.

The web material N is fed to a rewinder 13, for instance a continuous automatic peripheral rewinder, of a known type, where the web material is wound in secondary reels or logs B2, with or without an inner winding core. Rewinders are also known to those skilled in the art, and they will not be described in detail herein.

The secondary reels B2 produced by the rewinder 13 have a final free edge, so-called tail edge, or tail end, that shall be fixed to the outer cylindrical surface of the secondary reel B2 so as to prevent the secondary reel from opening during the subsequent processing. To this end, downstream of the rewinder 13, a machine 14 for sealing the free edge can be provided, which closes, by gluing, embossing, mechanical ply-bonding or in any other suitable manner, the final edge of each secondary reel B2.

In general, an accumulator 15 is provided downstream of the machine 14 for sealing the free edge, which divides the converting apparatus into two parts, which may have fluctuating production speeds, i.e. production speeds that vary over time differently in the two parts of the apparatus. The accumulator 15 forms a sort of tank or storage, allowing the production speed of the rewinder to vary with respect to the production speed of the machines downstream of the accumulator 15, among which a severing machine 12 is provided, subdividing the secondary reels B2 into single rolls R. Severing machines are also known to those skilled in the art, and they will not be described in detail herein.

The severing machine 12 also allows to cut the ends of the secondary reel B2, generally called "trimmings" L, corresponding to rolls of lower dimensions (in terms of axial length) than those of the final rolls R. The trimmings L are wastes that shall be removed from the flow of moving rolls.

In this example, the embossing unit 16 is such as to realize plies, and therefore secondary reels B2, with differentiated bands of patterns or embossing. The severing machine 12 is so configured as to cut the rolls in correspondence of the interface between the different bands, thus obtaining final rolls with different patterns or embossing (for instance two different types of rolls R' and R").

The axis z of the rolls R exiting the severing machine is horizontal. The severing machine has preferably two or more cutting channels, where the secondary reels B2 are put and progressively moved forwards during cutting. To each channel of the severing machine 12 corresponds one transport belt, or a plurality of moving belts, 17 conveying the rolls R towards the packing machine. In some configuration, a single moving belt 17 is provided, with the various channels separated by means of side banks, or a moving belt 17 for each channel, each separated by means of side banks.

On the contrary, a converting line for forming folded products such as wipes, facial tissues or paper towels, not specifically illustrated here, is provided with an interfolding machine instead of a rewinder 13. Therefore, the final products are not rolls, but distinct piles of interfolded paper plies. In this case, the machine for closing the free edge is omitted, but a machine is provided for wrapping the outer edges of the pile of interfolded sheets. Usually, paper sheets are used for wrapping. The accumulator 15 may be provided or not. A severing machine 12 is provided in this case again, for cutting the wrapped piles into finished products to be packed. Alternatively, the products may be cut without being wrapped in paper, but inserted in little cardboard boxes.

A further example of converting machine is constituted by the machines for producing napkins, not specifically illustrated herein. In this case, instead of an interfolding machine a folding machine is provided, which adequately folds the paper to form a folded continuous web that is then cut to form napkins with the classical folds ¼, ⅛, ⅙, known to those skilled in the art. Interfolding machines and folding machines for napkins are known to those skilled in the art and will not be described herein. The diagram of FIG. 1 is essentially valid for both the converting lines for forming folded products such as wipes, facial tissues or paper towels, and the lines for forming napkins, provided that the rolls R are considered as packs of paper sheets, and the device 31 is omitted.

With reference again to the specific example described above, the rolls R (both R' and R") are moved, through the series of moving belts 17, towards the packing machine 30, keeping the axis of the rolls horizontal. In the same manner, the interfolded and folded products are transported through moving belts 17 towards the packing machine 30.

At the entrance of the packing machine 30, a device 31 is provided for setting the rolls R upright so that the axes z thereof take a vertical position. Machines of this type are known in the art, and an example thereof is described in EP2001772.

Once set upright, the rolls R are conveyed by the upright setting device 31 to a carrier conveyor 32 moving along a direction X. Adequately, the rolls R rest with the flat base thereof on the movable surface defined by the carrier conveyor, for example moved in a loop between return rollers. The rolls R on the carrier conveyor are arranged, for example, according to lines parallel to the feed direction. In order to facilitate this arrangement, lanes 32A may be provided, defined on the same carrier conveyor. In a preferred configuration, the lanes 32A correspond to the feed channels of the severing machine 12, i.e. only one lane 32A corresponds to each channel of the severing machine 12. In this case, also the upright setting device 31 manages the rolls for single channel.

In this example, the packing machine 30 further comprises a pair of areas at the sides of the carrier conveyor 32, on which the rolls moving on the same carrier conveyor are packed. In particular, a first side area 33 is provided along a side of the carrier conveyor 32, and a second side area 34 is provided along the opposite site of the carrier conveyor 32.

Adequately, these side packing areas 33 and 34 are defined by two respective transport belts, respective a first and a second transport belt, for the sake of simplicity indicated with the same reference as the side areas 33 and 34, moving parallel to the carrier conveyor 32. The rolls are packed along the first and the second transport belt 33 and 34. Therefore the packs, while formed, are moved contemporaneously (not necessary at the same speed) to the rolls moving on the carrier conveyor, this resulting in reduced packing times.

Obviously, the speed and the type of moving of the transport belts 33 and 34 are different from those of the carrier conveyor. For example, the movement of one of the transport belts may be discontinuous, i.e. mainly characterized by downtimes interrupted by moving times, whilst, on the contrary, the movement of the carrier conveyor is preferably characterized by a substantially continuous movement, at least for a given rolls production cycle.

In other configurations, one or both the packing areas 33 and 34 have feeding systems for the rolls, or the group of rolls, constituted by some horizontal bars pushing the rolls. The horizontal bars can move, through a chain system driven around pulleys in a loop manner so as to form a path for the horizontal bars parallel to the carrier conveyor 32. This configuration is preferable if the rolls R move forwards with the winding cores arranged horizontally, so that the bars act on the flat face of the rolls. For moving the rolls R forwards it is possible to use other adequate equivalent systems, known to those skilled in the art.

FIG. 1 shows the example for two different types of packs. For example, on the carrier conveyor two different type of rolls R' and R'' move, derived from a second reel B2 provided with bands with two different types of embossing, and the need is to realize two different packs, one for each type of rolls. Also the trimmings L are on the carrier conveyor 32.

For example, on the first packing transport belt 33 positions are provided for arranging (automatically or with the aid of an operator) cardboard boxes H opened at the top. First rolls R' are taken from the carrier conveyor 32 and put in the boxes H. The boxes preferably move parallel to the carrier conveyor 32 with the rolls R', and are filling while the carrier conveyor moves forwards, thus realizing a first type of pack. The cardboard boxes are moved not perfectly horizontally but slightly inclined, so that the rolls are arranged in the same direction of inclination as the boxes.

A station 36 is for example provided along the second transport belt 34 for enwrapping the rolls R'' in a packing film according to known packing methods. Machines adapted to pack using film are disclosed in EP1655230, EP1899228, EP1254839. The rolls R'' are brought for example to the enwrapping station 36. These packs being formed, different from the first box-type described above, are moved by the second transport belt 34 only after having being completed in a enwrapping station, or they are moved between subsequent enwrapping station (if more station are provided along this area) to complete enwrapping operations in sequence until to complete the pack. A possible non-limiting configuration is the case in which, once arranged with the axis thereof horizontal, the rolls R'' are grouped in the transport belt 34 on more lines and more layers to be fed to a traditional wrapper. For example, rolls R'' may be grouped in two or more layer comprised of two or more lines. The groups of rolls R'' are fed to the wrapping station 36 by means of traditional systems such as belts, horizontal bars as described above carried by parallel chains, and other adequate systems known to those skilled in the art.

In this case, the packing machine is provided with at least one grouping device for forming a group of products that can be wrapped in a plastic or paper film according to a traditional wrapping sequence. The grouping device is indicated with the reference number 36A.

For example, a packing module may be provided at an end of the transport belt 34, provided with an elevator bringing the group of rolls from a lower height, equal to that of the transport belt 34, to a higher one. During this movement, the group of rolls achieves a plastic or paper film that partially surrounds the group of rolls. The subsequent wrapping sequence is equivalent to that of known packing machines, as described in EP1655230, EP1899228. In a further configuration, the elevator raises the group of rolls to a higher height without "meeting" a wrapping film. Once the elevator has ended its stroke, a pusher pushes the group of rolls towards and inside a tube made of plastic or paper film, so that it is packed as described in EP1771335.

Further types of packing may be provided on the transport belt 34 or 33 through bags. In this case, vertically arranged bags are transported on the transport belts 34, in which the rolls are directly put. The bag opening may be at the same height as the transport belts 33 or 34; in this case, it is preferable to replace the transport belts 33 or 34 with chain systems for transporting more easily the bags with the opening facing upwards. A closing system is provided at an end of the transport belt 33 or 34 for closing, for example through welding, the open end of the bag. Alternatively, it is possible to group the products as described above, and to convey the group of products, through the transport belts 33 or 34 towards a bagging machine as described in ITBO2008A000431. The bags are usually pre-formed, and have, a handle at an end thereof and, at the other end, the opening through which the products are inserted. Once the bag has been filled, the open end is sealed, for example by means of welding o other adequate systems. The rolls may be packed in the bags with the axes z arranged horizontally or vertically.

For example, FIG. 1A shows an example (a variant of that of FIG. 1) where the wrapping station 36 is provided at the end of the transport belt 34, so that the paper products are fed to the packing module of this station 36 for example through the grouping module 36A; the further packing module being preferably at the end of this transport belt.

With reference to FIG. 1A again, an example is shown of a forming station 80 for forming boxes H, arranged to supply the transport belt 33. For example, this forming station 80 is provided with a storage module 81 for cardboard blanks H1, a first moving device 82 to send the cardboard blanks H1 to a subsequent folding module 83 where the blanks are folded, with which a gluing module 85 is associated for gluing the blanks edges to form the boxes H, and a second moving device 84 sending the formed boxes to the transport belt 33.

In this example, the box forming station 80 is arranged at the side of the transport belt 80, wherein the feed direction of the cardboard blanks H1 from the storage module 81 to the forming module 82 being preferably parallel (but opposite) to the moving direction of the transport belt 33.

The rolls R are moved from the carrier conveyor 32 to the side packing areas through at least one robot 37, and more preferably a plurality of robots 37 arranged along the path of the carrier conveyor 32, for example hanging in series above the carrier conveyor 32.

FIG. 1B shows an example (a variant of the case illustrated in FIGS. 1 and 1A), where the carrier conveyor 32 carrying the paper products ends on a further packing area, so that the paper products are continuously fed to the same carrier conveyor 32 (i.e. without being moved by the robots 37 to the side packing areas), to this further packing area. For example, this packing area comprises a grouping module 36A and a subsequent wrapping station 36 for wrapping the group of products in film, and/or a bagging station and/or a packing station of the type forming a continuous tube of a plastic film or a paper film, where the group of products enters, so that closing joints are made at the ends of the tube portion to form a bag (examples of these stations are disclosed in EP1655230, EP1899228, EP1254839, EP1771335, EP2766266, BO2008A000431).

For instance, in the further packing area a wrapper is provided, i.e. a station where the group of products is wrapped in a flat film strip (a film made of plastic, paper, or other material) folded around the group of products (and that can therefore comprise one or more enveloping devices for enveloping the flat film strip around the group of products).

Therefore, in the example described above, first paper products provided on the carrier conveyor 32 may be taken by the robots 37 and put on the transport belts 33-34, whilst second paper products may be left moving on the carrier conveyor 32 towards the further packing station 36 provided at the end of the carrier conveyor 32. Or, the second paper products may be taken by the robots 37 to be conveniently grouped on the carrier conveyor 32 and to be fed to the further packing station 36, thus omitting the grouping module. Furthermore, in the structure described above it is possible to choose, according to the specific needs, whether to package by supplying only the side transport belts 33-34, or by supplying only the further packing station 36 arranged at the end of the carrier conveyor.

With reference to FIG. 1B again, the transport belts 33 and 34 are fed by stations 80 that form the boxes, as described above.

Adequately, the robots 37 are parallel robots, i.e. they have three arms connected to a base by means of universal joints. These types of robots are usually marketed; examples of these robots are ABB IRB360 FLEX PICKER, OMRON Hornet, and Fanuc Serie M-3. In practice, each robot 37 (see the diagram of FIG. 2) comprises a movable platform 37A, on which a handling member 37B is provided for taking and releasing the roll. The movable platform 37A is connected to a fixed platform 37C, for example above the carrier conveyor 32, through a plurality of articulated actuating arms that can change the distance between the two platforms in controlled fashion.

In other configurations, instead of a parallel robot a SCARA (Selective Compliance Assembly Robot Arm)-type robot can be used of the open chain type. Examples of these robots are ABB IRB910SC marketed by ABB and "eCobra" marketed by Omon.

The handling member 37B is formed, for example, by a pair of pincers or pliers adapted to take the rolls. The pliers can be of the type with jaws, between which a roll is held. This pliers configuration can be useful, for example, if the line and the packing machine are not provided with the device for setting the rolls upright, i.e. according to a vertical axis, and the rolls are thus arranged with the cylindrical side thereof resting on the carrier conveyor, i.e. they are arranged according to a horizontal axis z. This pliers configuration can be also useful with rolls completely filled with paper layers also in the central area thereof, i.e. not provided with an axial hole.

If the rolls have an axial hole, for example a cylindrical one, for example defined by a core, the pliers can be of the expansion type, i.e. can be inserted in the roll cavity and can expand pressing against the walls of the cavity.

Alternatively, the handling member 37B can be of the sucker type, preferably a sucking one. This type of handling member is more useful for handling pre-packed interfolded or folded products.

Adequately, the packing machine 30 may comprise a recognition device 38 for recognizing the rolls moving on the carrier conveyor, and an electronic management program adapted to associate, with the type of roll (R' o R") identified by the recognition device, a control for a given robot 37 for taking the roll and moving it towards the desired side packing area.

In practice, the recognition device 38, arranged preferably in correspondence of the initial part of the carrier conveyor, verifies the type of roll and the position thereof on the carrier conveyor, and sends the information to a robot 37. The robot, knowing the coordinates of the roll on the carrier conveyor and the speed of the carrier conveyor, is able to take the roll surely and to bring it to the desired packing area 33-34. If only one type of roll is provided, the recognition device only identifies the position of the roll on the carrier conveyor.

The recognition device comprises, for example, a vision system, comprising for instance a video cam 39 or, in other examples, more video cams.

Furthermore, a video cam can be provided for all the lanes of the carrier conveyor, arranged above the lanes, or a video cam for each lane, or a video cam for a given group of lanes.

In other examples, the recognition device also comprises other vision systems, such as video cams, fastened to the handling members of the robot 38, to allow the robot to recognize the rolls autonomously.

If on the carrier conveyor also the trimmings L are fed, i.e. Rolls of lower height than the height of the rolls to be packed, the recognition device may be able to recognize also these trimmings rolls and to control the robots so that these latter take them and bring them to a discharge area 40. The same applies to rolls R that are identified by the vision system as defective, and that cannot be therefore packed and shall be discharged.

As regards the trimming L and/or the rolls R to be discharged, a preferred embodiment of operation of the electronic management program provides that the recognition device identifies the trimmings and the rolls to be discharged and does not order the robots 37 to take them. Therefore, the trimming L and the rolls R to be discharged move along the whole carrier conveyor 32 and fall onto the discharge area 40 provided at the end of the same carrier conveyor.

In other example (see FIG. 2) the recognition device comprises one (or more) photocells or one (or more) optical sensors 39A (shown in broken line) arranged along the carrier conveyor 32 (preferably at the beginning thereof) adapted to verify the presence of rolls higher than a pre-set measure, so that these rolls are taken by the at least one robot. For instance, the rolls higher than a given height are taken by the robots 37 and brought to the packing area(s), whilst the rolls lower than the given height are considered trimmings and are not taken by the robots, being made fall onto a discharge area 40 provided at the end of the carrier conveyor.

In some examples, not illustrated herein, the packing machine comprises identification means for recognizing the boxes on the respective transport belt, adapted to recognize and/or identify the position of the boxes on the transport belt and, through an electronic program, to indicate where the product taken by the respective robot shall be put. These identification means comprise, for example, one or more vision systems (video cameras, optical sensors, photocells, etc.) arranged at the entrance of the at least one packing area, i.e. near the beginning (the point where the boxes enter) of a respective transport belt).

Here below, further variants of the cases described above will be illustrated.

A first variant relates for example to the format of the carrier conveyor. In the cases defined above, the carrier conveyor defines a single surface where the products to be packed rest. However, the carrier conveyor may be formed, for example, by parallel conveyor belts, whose overall width is equal to the width of the carrier conveyor, which are independent of one another, and which define lanes for the rolls. These parallel conveyor belts may have different moving speeds, in order to optimize the production times according to the needs.

In the previous examples, cases have been described where two side packing areas are provided on the sides of the carrier conveyor. In other examples, only one side packing area may be provided, for example in the form of a transport belt.

In the previous examples, cases have been described where two side packing areas are provided on the sides of the carrier conveyor, wherein an area is provided with boxes to be filled, and the other is provided with a wrapping station, a bagging station or a packing station for packing the rolls in a film. Obviously, in other examples, on both the side packing areas the same packing methods are provided, for example packing in boxes, or wrapping in film, or bagging.

Only one side packing area may be provided, for example in the form of a transport belt.

In the previous examples, cases have been illustrated where in the at least one packing area at least one transport belt is provided, and on this transport belt the products are packed directly in the area where they have been put by the at least one robot. In other examples, the products are grouped in the at least one packing area by the at least one robot, or by at least one different grouping machine, and are then packed by a packing station arranged along the at least one packing area.

In the previous examples, cases have been illustrated where a plurality of robots is provided. In the simplest case, only one robot may be used.

In the previous examples, cases have been illustrated where the converting apparatus comprises an unwinder, an embossing unit (or printing machine), a rewinder, and a severing machine. In other examples, the unwinder may be of the type adapted to receive a plurality of parent reels of different width (and, if necessary, with different finishing, like different printing and embossing, thus obtaining rolls of different types) equal to the width of the rolls that shall be produced therefrom, installed on the same unwinding axis, and a rewinder winds the plies coming from these parent reels to form directly (without secondary reels) the rolls on a same winding axis, therefore without the need for cutting the reels into rolls.

In the previous examples, cases have been illustrated where the converting line is formed by a single branch provided with a converting apparatus. In other examples, two (or more) branches may be provided, each of which is provided with a converting apparatus, each producing respective paper rolls. The branches end in a common packing machine.

As already mentioned, in a further example the packing machine 30 may be fed by one or more branches of the converting lines forming rolls of toilet paper and/or kitchen towels, by interfolding machines and/or by folding machines. The moving belts 17 of each line convey the respective products to the carrier conveyor 32 adapted to transport simultaneously different types of paper products such as wipes, napkins, handkerchiefs, rolls, etcetera, in addition to the trimmings resulting from the cutting of rolls. In this way, the recognition device 38 recognizes the different types of product, allowing the robots to pack different types of products in bags, boxes etc. In this way, the packs obtained meet the needs of a family or of an individual as regards the paper products intended for domestic use. In this case again, the recognition device 38 recognizes non-conform products and defective products that shall be discharged together with the trimmings. For example, prepacked interfolded or folded products could have closing defects, they could be partially opened or deformed. The diagram of FIG. 1 applies essentially to this example too, provided that the rolls R are considered generic paper products (wipes, napkins, handkerchiefs, rolls, pre-packs thereof, etc.), if necessary without the device 31.

Figure 4:
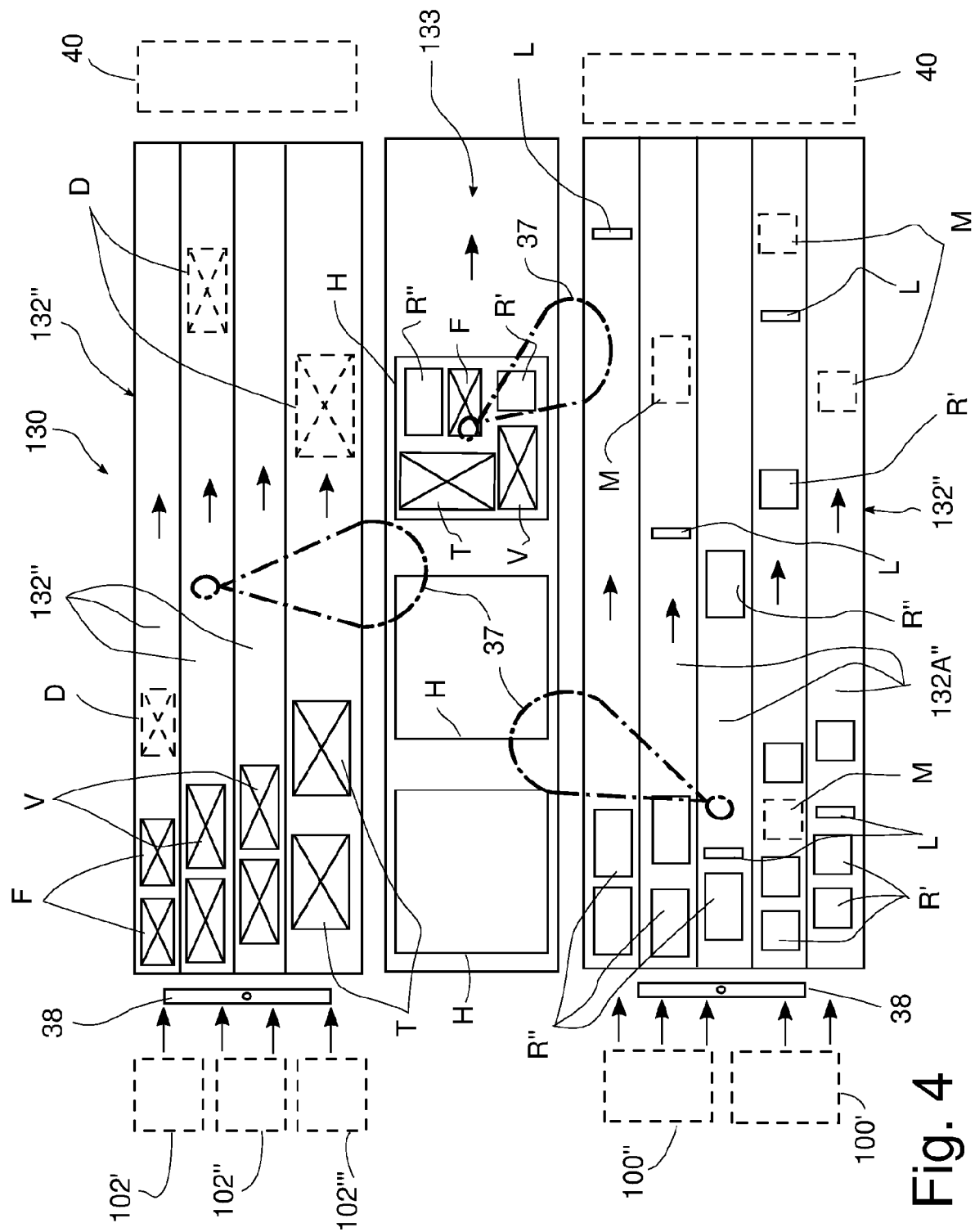
FIG. 4 is a schematic plan view of a variant of a packing machine according to the invention.
Figure 5:
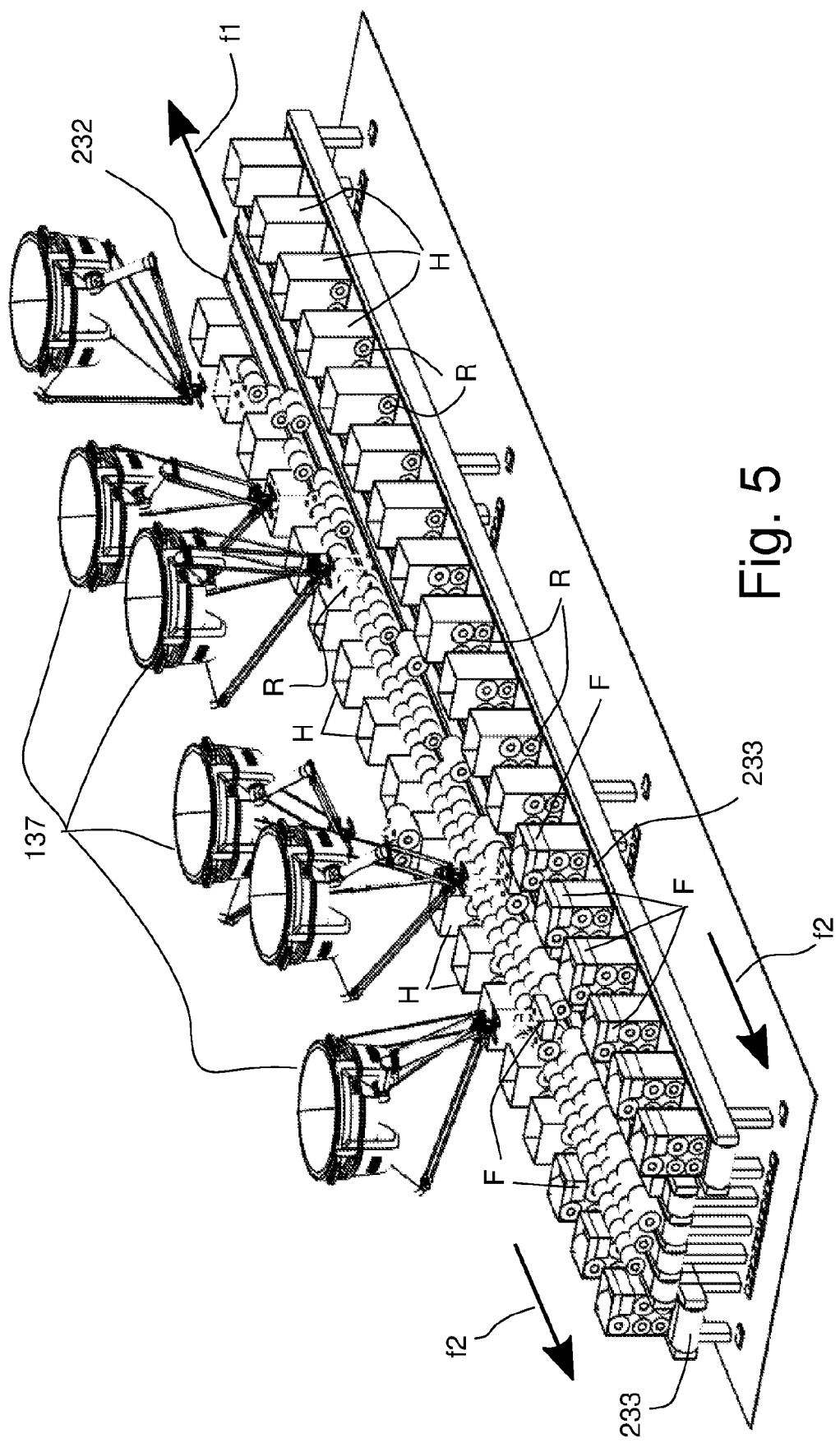
FIG. 5 is a schematic axonometric view of a variant of a packing machine according to the invention.

In a further configuration, shown for example in FIG. 4, the packing machine 130 comprises two preferably parallel carrier conveyors 132' and 132", with one or more respective lanes 132A' and 132A" transporting products of different type from converting lines or branches.

For example, on a first carrier conveyor 132' there may be a first type of rolls R' and a second type of rolls R" coming from a same converting branch 100 or from different converting branches 100' and 100", as described above, together with the respective trimmings L and any non-conform rolls M.

On the second carrier conveyor 132" there may be other types of products, such as packs of rolls, folded products, interfolded products V, napkins T, handkerchiefs F, if necessary pre-packed, coming from example from respective converting branches 102', 102", 102''', together with respective non-conform products D (for each type).

A packing area is provided between the two carrier conveyors 132, defined by a transport belt 133, on which the products provided on the two carrier conveyors can be packed. Cardboard boxes H and/or pre-formed bags, to be filled with the different types of products on the two carrier conveyors 132, are conveyed, for example, to the transport belt 133. The transport belt 133 may move in the same direction, or in opposite direction, with respect to the two carrier conveyors 132.

In this configuration, the robots 37 are arranged on two lines above the areas separating the transport belt 133 from the carrier conveyors 132' and 132". In this case, for example, the robots of a line adjacent to a respective carrier conveyor 132 handle the products related to that adjacent carrier conveyor. In a further configuration, the robots 37 are arranged above the transport belt 133 and handle the products from both the carrier conveyors.

The recognition device 38 is provided for detecting the products and communicating the position thereof to the robots for the adequate handling thereof, as explained for the previous examples. A recognition device 38 for each carrier conveyor may be provided. In both cases, the recognition device(s) 38 are adapted to recognize and discharge the trimmings and/or the non-conform products.

In a possible variant, instead of the boxes on the central transport belt 133, a traditional packing station may be provided at the end of the transport belt 133, for wrapping or bagging operations. In this case, the robots 37 form, on the central transport belt 133, groups of products (groups of products of the same type or groups of different products), that are then conveyed by the transport belt 133 to the packing station (these types of stations are described, for example, in EP1771335, EP1899228, EP1655230, EP2766266, BO2008A000431).

In a possible variant of the solution of FIG. 1, a central carrier conveyor 232 is provided and two approximately parallel transport belts 233 adjacent to the carrier conveyor 232, with robots 237 arranged above this latter. In this configuration again, on the carrier conveyor 232 it is possible to transport products of the same type, for example rolls R of toilet paper or kitchen towels (in this example the axis of the rolls R is arranged horizontally), handkerchiefs F, napkins, wipes or the like, or a set or a sub-set of these paper products (i.e. products different from one another). In some cases, some products may be fed to the carrier conveyor already pre-packed. For example, a group of rolls of toilet paper may be wrapped in a film or a group of napkins or handkerchiefs may be wrapped in a paper sheet or contained in a cardboard box.

Also in this configuration the carrier conveyor 232 can move (arrow f1) in opposite direction with respect to the transport belts 233 (arrows f2). In other words, while the paper products move forwards along a direction supported by the carrier conveyor 232, the boxes H are transported by the transport belts 233 and move forwards along an opposite direction. The transport belts and the carrier conveyors may have opposite directions of movement, and may also have different speed according to the type of pack in order to optimize the packing cycle, reducing the times and increasing the productivity of the packing machine. In a simplified configuration of the invention, only one carrier conveyor 232 and only one transport belt 233 are provided, arranged approximately parallel to each other and moving according to the same direction or according to opposite directions, wherein the speeds of transport of the products may be equal to, or different from, that of the boxes; in other words, it is possible to feed more quickly the boxes than the paper products, or vice versa, based on the cycle that optimizes the productivity of the packing machine.

FIGS. 6a-6h show summary diagrams of the arrangements of only the carrier conveyors 332 in some preferred embodiments, which are adapted to transport the products before packing, with transport belts 333 forming the side packing areas. The methods for packing the products and arranging them, as well as the types of products used, are not shown, as they can be as various as possible, combining the examples illustrated above (use of products of only one type, or of mixed products; packing in boxes for products of the same type or for mixed products; use of wrapping stations, etc.). The directions of movement of the various components are indicated by means of arrows.

FIG. 6a shows one carrier conveyor and one single packing transport belt arranged at the side of the carrier conveyor and moving in the same direction.

FIG. 6b shows one carrier conveyor and only one packing transport belt arranged at the side of the carrier conveyor and moving in opposite direction with respect thereto.

FIG. 6c shows one carrier conveyor and two packing transport belts arranged at the sides of the carrier conveyor and moving in the same direction with respect thereto.

FIG. 6d shows one carrier conveyor supporting products and two packing transport belts arranged at the sides of the carrier conveyor and moving in opposite direction with respect thereto.

FIG. 6e shows one carrier conveyor supporting products and two packing transport belts arranged at the sides of the carrier conveyor and moving in in opposite direction with respect to each other, i.e. one moves in the same direction as the carrier conveyor, and the other in the opposite direction.

FIG. 6f shows two carrier conveyors arranged at the opposite sides of one packing transport belt, all three moving in the same direction.

FIG. 6g shows two carrier conveyors arranged at the opposite sides of one packing transport belt, the two carrier conveyors moving in the same direction, which is opposite with respect to the movement direction of the transport belt.

FIG. 6h shows two carrier conveyors arranged at the opposite sides of one packing transport belt, the two carrier conveyors moving in opposite direction with respect to each other, i.e. one carrier conveyor moving in the same direction of the transport belt, and the other carrier conveyor moving in opposite direction.

As mentioned above, the speeds of the various carrier conveyors and transport belts, in the same configurations, may be different according to the production requirements.

With the packing machine of the invention described above it is possible to gain great advantages with respect to the prior art packing machines integrated in traditional converting lines.

First of all, the packing machine of the invention is scalable according to the production targets, and is therefore very flexible.

Furthermore, it allows producing two or more different formats of paper products packs at the same time.

Moreover, it allows realizing packs containing different types of products in the best possible manner.

In the case of two or more paper products production branches, it is possible to continue the production with one branch whilst the other is stopped for changing format.

If a product recognition device is used, an intrinsic quality control may be provided.

It is understood that what is illustrated purely represents possible non-limiting embodiments of the invention, which may vary in forms and arrangements without departing from the scope of the concept on which the invention is based. Any reference numerals in the appended claims are provided for the sole purpose of facilitating the reading thereof in the light of the description above and the accompanying drawings and do not in any way limit the scope of protection.

The invention claimed is:

1. A converting line for converting paper plies, starting from parent reels, into paper products, comprising at least two different converting branches for converting the paper plies into at least two different paper products including two or more branches for converting the paper plies into the at least two different paper products, that end in a common packing machine, so that on said common packing machine there are different types of paper products, wherein said common packing machine for packing paper products, comprises:
    at least one carrier conveyor, onto which the paper products to be packed are arranged;
    at least one side packing area at a side of the at least one carrier conveyor, where said paper products are packed;
    at least one robot adapted to take the paper products from said at least one carrier conveyor and to put the paper products in said at least one side packing area;
    wherein said at least one side packing area comprises a transport belt parallel to said at least one carrier conveyor; and
    wherein said different types of paper products processed by said common packing machine comprise rolls of toilet paper, rolls of kitchen towels, napkins, handkerchiefs, paper towels, packs of rolls of toilet paper, packs of rolls of kitchen towels, packs of napkins, packs of handkerchiefs and/or packs of paper towels.

2. The converting line according to claim 1, wherein said at least one robot is controlled to take different paper products and to insert the different paper products into boxes or move the different paper products towards packing areas, in order to provide packs or boxes containing paper products that are at least partially different from one another.

3. The converting line of claim 1, further comprising a plurality of said at least one robot, arranged above said at least one carrier conveyor.

4. The converting line of claim 1, wherein said at least one carrier conveyor has a plurality of lanes parallel to a feeding direction and adapted to receive parallel lines of said paper products.

5. The converting line of claim 1, wherein said transport belt transports a plurality of boxes, into which said at least one robot puts said paper products.

6. The converting line of claim 1, wherein two separate side packing areas of said at least one packing area are provided, and arranged at opposite sides of said at least one carrier conveyor; each of said two separate side packing areas comprising a transport belt parallel to said at least one carrier conveyor and said transport belt transports a plurality of boxes into which said at least one robot puts said paper products.

7. The converting line of claim 1, wherein the at least one carrier conveyor and the transport belt of the at least one packing area move in a same direction or in an opposite direction.

8. The converting line of claim 1, wherein two of said at least one carrier conveyor are arranged parallel, between which said at least one side packing area is provided; and said at least one side packing area comprises a transport belt arranged between, and parallel to two of said at least one carrier conveyor.

9. The converting line of claim 1, adapted to form groups of products on said at least one side packing area and to process said groups of products so as to make packs around said groups; said groups being directly made by positioning the products, handled by said at least one robot, on said at least one side packing area or through at least one grouping device working on said at least one side packing area.

10. The converting line of claim 1, wherein said at least one carrier conveyor is adapted to transport a plurality of paper products of different types; said common packing machine comprising a recognition device for recognizing the different types of said plurality of paper products moving on said at least one carrier conveyor, adapted to recognize and/or to identify position of the paper products on said at least one carrier conveyor, and a management electronic program adapted to associate with a paper product recognized by said recognition device, a control for said at least one robot for taking the paper product and moving the paper product towards one of said at least one side packing area and/or towards a discharge area in case of non-conforming paper products and/or trimmings; said management electronic program controls said at least one robot so that said at least one robot puts in said at least one side packing area a given plurality of said paper products of different types to make a pack formed of the paper products at least partially different from one another.

11. The converting line of claim 10, wherein said recognition device comprises a photocell or an optical sensor arranged along said at least one carrier conveyor and adapted to verify presence of rolls, so that said rolls are taken by said at least one robot.

12. The converting line of claim 1, wherein said at least one carrier conveyor transporting the paper products ends on at least one further packing area, so that the paper products are fed to said at least one carrier conveyor continuously without being put by said at least one robot in said at least one side packing area, said at least one further packing area comprising a wrapping station and/or a bagging station and/or a packing station of a type forming a continuous tube of a plastic film or a paper film, where a group of the paper products enters so that closing joints are made at ends of a portion of the tube to form a bag.

13. The converting line of claim 1, further comprising a branch for producing paper rolls by converting paper plies wound into parent reels, the branch comprising
an unwinder for unwinding at least one parent reel, into which a paper ply is wound,
a rewinder, adapted to produce a secondary reel by winding at least one paper ply unwound from said at least one parent reel, of a diameter substantially equal to a diameter of the rolls to be produced,
one or more severing machines, adapted to cut said secondary reel into paper rolls.

14. A method for packing of paper products, comprising steps of:
producing at least two different paper products starting from parent reels, through at least two different converting lines for converting paper plies,
moving said at least two different paper products onto at least one carrier conveyor,
moving by at least one robot, said at least two different paper products from said at least one carrier conveyor to at least one side packing area arranged at a side of said carrier conveyor, wherein said at least one side packing area is defined on at least one transport belt moving parallel to said at least one carrier conveyor,
making a pack, containing a plurality of said at least two different paper products, on said at least one side packing area so as to make, on a common packing machine equal packs containing different products,
wherein the at least one transport belt moves in a common direction or in an opposite direction with respect to that of the at least one carrier conveyor.

15. The method of claim 14, wherein
on said at least one side packing area at least one box having an open top is provided into which a plurality of said products are inserted by said at least one robot; said box being adapted to move parallel to the at least one carrier conveyor, and/or
on said at least one side packing area a plurality of products coming from said at least one carrier conveyor are wrapped in film by said at least one robot, so as to make a pack of rolls, and/or
a plurality of said products are bagged on said at least one side packing area.

16. The method of claim 14, wherein said at least one carrier conveyor transporting the paper products ends on at least one further packing area, so that the paper products are fed to said at least one carrier conveyor continuously, on said at least one further packing area, comprising a wrapping station and/or a bagging station and/or a packing station of a type forming a continuous tube of a plastic film or a paper film, where the group of paper products enters, so that closing joints are made at ends of a portion of the tube to form a bag; first paper products provided on the at least one carrier conveyor are taken by said at least one robot and put on the at least one transport belt, while second paper products are left moving on said at least one carrier conveyor towards the at least one further packing area provided at an end of said at least one carrier conveyor, or said second paper products are handled by said at least one robot so as to be grouped on said at least one carrier conveyor to be fed to said at least one further packing area; being possible to choose, according to specific need, whether to package by supplying only the at least one transport belt, or by supplying only the at least of further packing area arranged at the end of said at least one carrier conveyor.

* * * * *